Patented Feb. 7, 1939

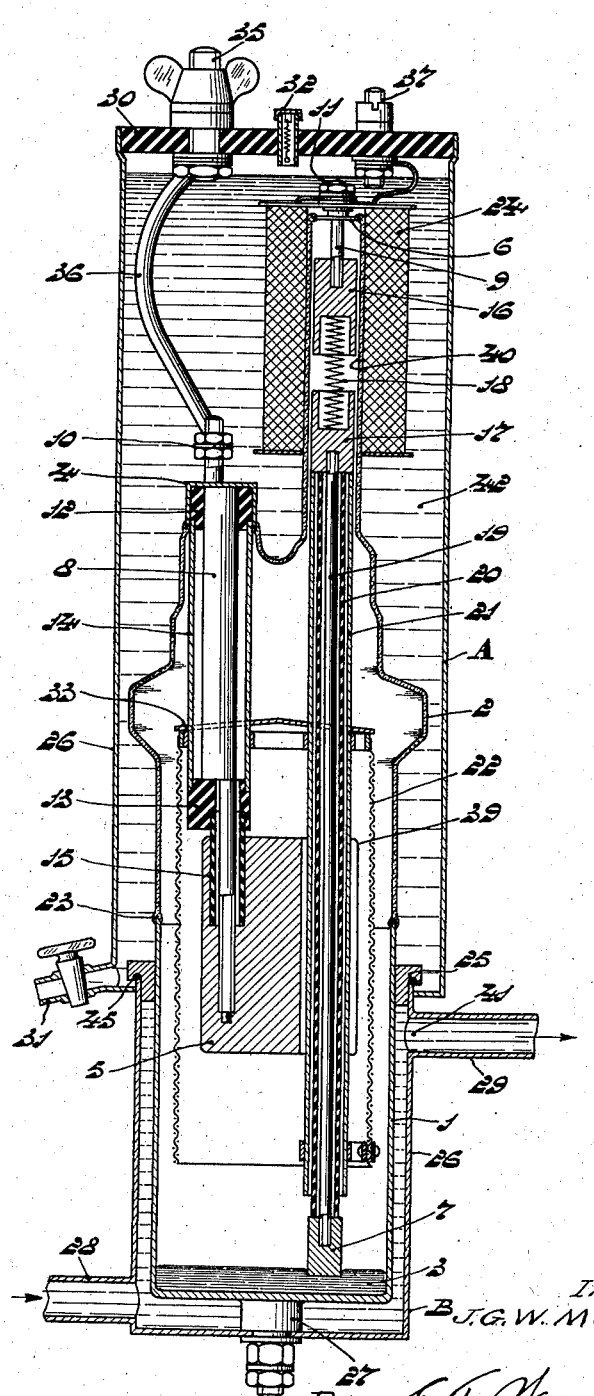

2,146,345

UNITED STATES PATENT OFFICE 2,146,345

MERCURY-VAPOR RECTIFIER

Johannes Gijsbertus Wilhelm Mulder, Eindhoven, Netherlands, assignor to N. V. Philips' Gloeilampenfabrieken, Eindhoven, Netherlands Application November 18, 1936, Serial No. 111,543
In Germany November 21, 1935

13 Claims. (Cl. 250—27.5)

The present invention, which forms a continuation-in-part of my copending U. S. patent application Ser. No. 67,155, filed March 4, 1936, relates to mercury-vapor rectifiers and more particularly to single-phase mercury-vapor rectifiers having metal-glass envelopes capable of being artificially cooled.

In my prior application I described a rectifier having a metal envelope portion containing a mercury cathode and provided with a cooling device in the form of a surrounding jacket, and a glass envelope portion exposed to the atmosphere. While with such a construction the metal portion can be maintained at a practically uniform temperature of any desired degree, I have found that the temperature at different points of the glass portion greatly varies depending upon the position of these points with respect to the heat-radiating parts of the tube.

Such temperature differences of the glass portion had several disadvantages; for example, due to the unduly high local temperatures and difference in temperatures, this portion may become damaged, and the mercury-vapor within the rectifier may condense upon an excessively cold part of this portion. This condensation may deleteriously affect the operation of the rectifier, for instance by short-circuiting members under tension, or by coming into contact with hot parts of the rectifier to thereby cause a sudden increase in vapor pressure, which may readily result in the formation of back discharges. Such reactions may endanger the proper functions and even the life of the tube.

If the cooling jacket were enlarged to surround the glass portion, it would become very difficult to maintain the glass portions and metal portions at widely different temperatures. Thus, either the metal portion becomes too hot or the glass portion surrounding the anode becomes too cold, and as a result the mercury condensation adjacent the mercury supply will be insufficient, but in the neighborhood of the anode it will occur in a very undesired manner.

The object of my invention is to eliminate the above disadvantages and for this purpose I provide means to maintain the glass portions at a uniform temperature which is higher than that of the metal portion and to such an extent that condensation of mercury on the glass portions, as well as on the tube parts within the same is avoided, and that practically the entire mercury condensation takes place in the coldest parts of the tube, i. e. in parts adjacent the mercury cathode.

More particularly, I separately cool the metal envelope portion with a circulating liquid, and surround the glass envelope portion with a jacket forming a separate refrigerating chamber containing an insulating cooling substance that is liquid at the operating temperature of the rectifier.

As the above-mentioned cooling of the hot glass portions may not suffice for maintaining the desired operating temperature, I prefer to adjacently arrange the cooling jackets for the metal and glass portions and to separate same only by a member of good heat conductivity.

The rectifiers according to the invention have the advantages that all parts of the glass portion can be maintained at such a temperature that there is no undesirable mercury condensation thereon or on the parts enclosed thereby. Furthermore, the glass portion is maintained at a uniform temperature throughout, whereby the possibility of cracking is considerably less than if it were merely surrounded by the atmosphere.

Further advantages of my invention will appear as the description progresses.

In order that my invention may be clearly understood and readily carried into effect, I shall describe same more fully in connection with the accompanying drawing, in which the single figure is a sectionized side view of a single-phase mercury-vapor rectifier according to the invention.

The rectifier shown in the drawing has an envelope comprising a cup-shaped member 1 of metal, for instance chrome iron, and an upper portion 2 of glass hermetically sealed thereto at 23. Within the bottom of portion 1 is a quantity of mercury 3 acting as the cathode.

Hermetically sealed to the upper end of portion 2 is a cup 4, for instance of ferrochrome, carrying on its upper surface a terminal 10. Secured to the lower surface of cup 4 is a rod 8 of conductive material having a stepped lower end to which is screwed a main anode 5 of cylindrical shape and provided with a cylindrical slot 39. Surrounding rod 8 and insulatingly supported therefrom by two insulating bushings 12 and 13 is a metal tube 14, which serves to screen the rod 8 from the discharge. A tube 15 of insulating material extends into a cavity in anode 5 and screens the point of connection between bushing 13 and rod 4.

The glass portion 2 extends upwards into a tubular protuberance 40, into whose upper end is hermetically sealed a plate 6, for instance of ferrochrome, carrying a terminal 11. Secured to plate 6 and extending downwardly is a rod 9 of conductive material carrying on its lower end a cylindrical core 16 of soft iron. Electrically secured with one end to the core 16, and secured with its lower end to a plunger 17 of soft iron, is a compression spring 18. Screwed to the bottom of the plunger 17 is a rod 19 of conductive material carrying at its lower end a cylindrical igniting anode 7, which in the position shown contacts with the mercury 3. A tube 20 of insulating material surrounds the rod 19 and protects same against the discharge.

Supported by tube 14 is a metallic cylindrical screen 22 with closed top 33, the screen extending downwards to protect the seal 23 from the discharge, and carrying a metal tube 21 for guiding rod 19 and tube 20 and extending through the slot 39. Thus plunger 17, rod 19, tube 20, and anode 7 form a unit which may be moved vertically within tube 21 to lift anode 7 from the mercury and thus produce an auxiliary discharge between anode 7 and the cathode mercury 3. To produce this movement an actuating coil 24 surrounds the projecting portion 40 and is supported from terminal 11.

Surrounding the rectifier tube is a cooling jacket 26 divided into two chambers A and B by a flange 25 of good heat-conducting material secured to member 1. Upon inserting the rectifier tube into the jacket 26 the flange 25, with the aid of a suitable gasket 45, forms a liquid-tight joint at 30, whereas a stud 27 extending through the bottom of the jacket 26 serves to hold the tube in place and as a cathode connection.

By arranging the chambers A and B adjacent and separating same by the member 25, a considerable portion of the heat energy transmitted to the insulating liquid 42 is conducted away by the circulatory liquid 41, thereby insuring a substantially lower temperature of the glass portion 2.

The top of jacket 26 is closed by a snugly-fitting plate 30 of insulating material carrying a terminal 35 connected through a conductor 36 to the main anode terminal 10, and a terminal 37 connected through coil 24 to the terminal 11 and to the anode 7. A safety valve 32 disposed in plate 30 serves to relieve any pressure which may be developed within chamber A, and a petcock 31 serves to draw off the oil.

Such a construction makes it very simple to assemble the rectifier in the jacket 26. By making the diameter of jacket 26 of sufficient size it can be detached from the rectifier in a single operation by loosening the stud 27.

Chamber B is provided with an inlet connection 28 and an outlet connection 29 for the flow of a suitable circulating medium 41, for instance water.

Chamber A is filled to a level at least above the top of the portion 40 with a cooling insulating medium 42, which is in its liquid state when the rectifier is at its normal operating temperature. As suitable materials may be mentioned oil or substances composed of compounds of the series of fatty acids, e. g. vaseline. Chamber A has both the function of cooling and the function of maintaining this portion at a uniform temperature throughout, and the temperature of many of the points on this portion is raised to a degree greater than that which would occur with no cooling device. As a rule the temperature of the glass portion is maintained at about 70° C. when the metal portion is substantially at ordinary temperatures.

The best operating conditions can be obtained preferably by maintaining the metal member 1 substantially at the temperature of the atmosphere by means of the circulating medium 41, and by maintaining the glass part at a temperature which is sufficiently low to protect the glass portion 2 from excessive heat, but which is sufficiently above the temperature of the metal portion 1 to prevent mercury deposits upon the upper portion of the envelope. These temperature conditions can be obtained by altering the radiating surface of the jacket of chamber A and by varying the circulating speed of medium 41 in the chamber B. In this manner the glass portion 1 is preferably given a temperature at least 40° C. higher than the metal portion 1.

If the glass portion 2 were cooled only by the surrounding air, as is generally the case, the portion of the glass portion in the vicinity of the seal 23, as well as the upper portion thereof, would be heated to a high temperature, whereas the intermediate portion would be very cold, and as a result a mercury deposit on this intermediate portion might bring about difficulties during the operation. The use of the oil bath according to the invention overcomes these difficulties, as all portions of the envelope surrounded by the oil are maintained at a uniform temperature and at the proper degree.

It will be noted that the seal 23, as well as the support leads for the anodes 5 and 7, and at least the upper part of anode 5, are surrounded by the chamber A; this giving very favorable results. Furthermore, it will be noted that the component members of the assembly, including coil 24 and glass portion 1, are adequately protected, the device is readily assembled and has a substantially cylindrical shape.

While I have described my invention in connection with specific applications and examples, I do not wish to be limited thereto, but desire the appended claims to be construed as broadly as permissible in view of the prior art.

What I claim is:—

1. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, an anode within said envelope, a current supply conductor for said anode passing through said glass portion, means to maintain said metal portion at a predetermined temperature, and means to maintain all points of said glass portion and said metal-to-glass seal at a substantially uniform temperature which is higher than the temperature of said metal portion.

2. A single-phase mercury-vapor rectifier comprising an envelope having a cup-shaped metal portion and a glass portion hermetically sealed together to form a metal-to-glass seal, a mercury-cathode within said metal portion, and a main anode partly closing the open end of said cup-shaped metal portion to form therewith the discharge space of the tube, said metal portion also serving as a condensation chamber, a supply conductor for said anode hermetically sealed in said glass portion, and means to maintain all points of said glass portion and said metal-to-glass seal at a substantially uniform temperature which is higher than the temperature of said metal portion.

3. A single-phase mercury-vapor rectifier comprising a cup-shaped metal portion serving as a condensation vessel and as a main discharge vessel and a vitreous portion fused to said metal portion to form a metal-to-glass seal, a mercury cathode within said metal portion, a main anode within said envelope, a current supply conductor for said anode passing through said vitreous portion, means for maintaining said metal portion at a predetermined temperature at which condensation of the mercury vapor will be effected on the surface thereof, and means for maintaining all points of said vitreous portion and said metal-to-glass seal at a substantially uniform temperature above the temperature at which there would be condensation of mercury vapor and below the temperature at which said vitreous portion and seal would be deleteriously affected.

4. A single-phase mercury-vapor rectifier comprsing an envelope having a cup-shaped metal bottom portion and a vitreous portion hermetically sealed together to form a metal-to-glass seal, a mercury cathode within said metal portion, said metal portion serving as a condensation vessel and as a main discharge vessel, a main anode and an auxiliary igniting anode within said envelope, current supply conductors for said anode and passing through said vitreous portion, a substantially cylindrical jacket surrounding said envelope, a member of a good heat-conducting material secured to said metal portion and dividing the space between the envelope and jacket into a chamber surrounding said metal portion and a second chamber surrounding said vitreous portion and said metal-to-glass seal, a circulating cooling liquid within said first chamber and in contact with said member, and a cooling substance within said second chamber and in contact with said member, said substance being in its liquid state during operation of the rectifier.

5. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, an anode within said envelope, a current supply conductor for said anode passing through said glass portion, a cooling jacket surrounding said metal portion and adapted to receive a circulating cooling liquid, a second cooling jacket surrounding said glass portion and said metal-to-glass seal and an insulating substance within said second jacket, said substance being in its liquid state at the operating temperature of the rectifier.

6. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, an anode within said envelope, a current supply conductor for said anode passing through said glass portion, a cooling jacket surrounding said metal portion and adapted to receive a circulating cooling liquid, a second cooling jacket adjacent to said first jacket and surrounding said glass portion and said metal-to-glass seal, an insulating substance within said second jacket, said substance being in its liquid state at the operating temperature of the rectifier, and a member of good heat-conducting material forming a partition common to both jackets.

7. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, an anode within said envelope, a current supply conductor for said anode passing through said glass portion, a substantially cylindrical closed cooling jacket surrounding said envelope, a member of good heat-conducting material separating said jacket into two chambers, a circulating cooling medium within the chamber adjacent the metal portion, an insulating substance within the other chamber and adjacent said glass portion and said metal-to-glass seal, said substance being in its liquid state at the normal operating temperature of the rectifier.

8. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, an anode within said envelope, a cooling jacket surrounding said metal envelope, a member of good heat-conducting material separating said jacket into two chambers, a circulating cooling liquid within the chamber adjacent the metal portion, an insulating substance within the other chamber and adjacent said glass portion and said metal-to-glass seal, said substance being in its liquid state at the normal operating temperature of the rectifier, said member supporting said envelope from said jacket.

9. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode disposed in said metal portion, an anode within said envelope, a cooling jacket surrounding said envelope and having two chambers, a circulating cooling liquid in the chamber surrounding said metal portion, and an insulating substance within the other chamber and adjacent said glass portion and said metal-to-glass seal, said substance being in its liquid state at the operating temperature of the rectifier, said jacket having a cross section larger than that of the envelope to allow removal thereof.

10. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode disposed in said metal portion, an anode within said envelope, means to maintain said metal portion at a predetermined temperature, and means to maintain every point of said glass portion and said metal-to-glass seal at a substantially uniform temperature at least 40° C. higher than the temperature of the metal portion, said means comprising a cooling jacket around said metal portion and adapted to receive a circulating cooling liquid, a second cooling jacket around said glass portion and said seal, and an insulating substance within said second jacket, said substance being in its liquid state at the operating temperature of the rectifier.

11. A single-phase mercury-vapor rectifier comprising an envelope having a metal portion and a glass portion jointed together to form a hermetic seal, said metal portion serving as a condensation vessel and as a main discharge vessel, a mercury cathode disposed in said metal portion, a main anode and an auxiliary anode within said envelope, supports and leads for said anodes extending through said glass portion, a jacket surrounding said glass portion, said metal-glass seal, supports, leads and at least part of said main anode being surrounded by said jacket, an insulating substance within said jacket and being in its liquid state during operation of the rectifier, and a second jacket surroundng said metal portion and adapted to receive a circulating cooling liquid.

12. A single-phase mercury-vapor rectifier comprising an envelope having a metal portion and a glass portion hermetically sealed together to form a metal-to-glass seal, said metal portion serving as a condensation vessel and as a main discharge vessel, a mercury cathode within said metal portion, a main anode and an auxiliary anode within said envelope, supply conductors for said anodes extending through said glass portion, means including an electromagnet disposed outside said envelope to move said auxiliary anode into and out of contact with said mercury cathode, a cooling jacket surrounding said metal portion and adapted to receive a circulating cooling liquid, a second cooling jacket surrounding said glass portion, said metal-to-glass seal, part of said main anode, said supply conductors, and said coil, and an insulating substance within said second jacket, said substance being in its liquid state at the operating temperature of the rectifier.

13. A single-phase mercury-vapor rectifier comprising an envelope having a cup-shaped metal bottom portion and a glass portion hermetically sealed thereto to form a metal-to-glass seal, said metal portion serving as a condensation vessel and as a main discharge vessel, a mercury cathode within said bottom portion, a main anode and an auxiliary igniting anode within said envelope, supply conductors for said anodes extending through said glass portion, a substantially cylindrical metal jacket surrounding said envelope, a member of good heat-conducting material secured to said metal portion, said member forming a liquid-tight joint with said jacket and dividing same into a closed chamber surrounding said glass portion and said metal-to-glass seal and a second chamber surrounding said metal portion, a circulating cooling liquid within said second chamber, a cooling substance within said first chamber, and a valve for relieving the pressure in said first chamber, said substance being in its liquid state during operation of the rectifier.

JOHANNES GIJSBERTUS WILHELM MULDER.